US008288734B2

(12) United States Patent
Norris

(10) Patent No.: US 8,288,734 B2
(45) Date of Patent: Oct. 16, 2012

(54) REMOTE DETECTION OF EXPLOSIVE SUBSTANCES

(75) Inventor: Wayne B. Norris, Santa Barbara, CA (US)

(73) Assignee: BOSS Physical Sciences LLC, Troy, MI (US)

( * ) Notice: Subject to any disclaimer, the term of this patent is extended or adjusted under 35 U.S.C. 154(b) by 0 days.

(21) Appl. No.: 13/184,919

(22) Filed: Jul. 18, 2011

(65) Prior Publication Data

US 2011/0272590 A1 Nov. 10, 2011

Related U.S. Application Data

(60) Division of application No. 12/503,300, filed on Jul. 15, 2009, now Pat. No. 8,080,808, which is a continuation-in-part of application No. 11/489,261, filed on Jul. 18, 2006, now Pat. No. 7,573,044.

(60) Provisional application No. 61/168,244, filed on Apr. 10, 2009.

(51) Int. Cl.
G01N 23/00 (2006.01)

(52) U.S. Cl. .................................................. 250/390.04

(58) Field of Classification Search . 250/390.01–390.12
See application file for complete search history.

(56) References Cited

U.S. PATENT DOCUMENTS

| 3,781,564 | A | 12/1973 | Lundberg |
| 3,832,545 | A | 8/1974 | Bartko |
| 4,529,571 | A | 7/1985 | Bacon et al. |
| 4,616,833 | A | 10/1986 | Geller |
| 4,851,687 | A | 7/1989 | Ettinger et al. |
| 5,006,299 | A | 4/1991 | Gozani et al. |
| 5,076,993 | A | 12/1991 | Sawa et al. |
| 5,078,952 | A | 1/1992 | Gozani et al. |
| 5,080,856 | A | 1/1992 | Grenier et al. |
| 5,114,662 | A | 5/1992 | Gozani et al. |
| 5,124,554 | A | 6/1992 | Fowler et al. |

(Continued)

FOREIGN PATENT DOCUMENTS

EP 1882929 A1 1/2008

(Continued)

OTHER PUBLICATIONS

Dogan et al., "Efficiency and angular resolution calculations for a prototype multiple Compton scatter camera," 1994, Nuclear Instruments and Methods in Physics Research A, vol. 345, pp. 296-302.*

Primary Examiner — Kiho Kim
(74) Attorney, Agent, or Firm — Endurance Law Group PLC

(57) ABSTRACT

Apparatus and methods for locating certain substances of interest within remote targets. The detection apparatus includes a neutron beam generator, a pixilated gamma ray detector, data collection modules and sensors, and a detection processing module. If the remote target contains substances of interest, gamma rays radiate isotropically from the remote target when it is bombarded by the neutrons. A portion of these gamma rays are intercepted and detected by a plurality of discrete gamma sensing elements contained in the gamma ray detector, which is spaced apart from the neutron source. The detection processing module determines whether the remote target contains explosive substances and further locates the target by processing the collected data from the gamma ray detector, status information collected from the neutron source, and the position sensor(s) associated with the neutron shield.

2 Claims, 13 Drawing Sheets

U.S. PATENT DOCUMENTS

| | | | |
|---|---|---|---|
| 5,278,418 A * | 1/1994 | Broadhurst | 250/390.04 |
| 5,388,128 A | 2/1995 | Gozani | |
| 5,410,575 A | 4/1995 | Uhm | |
| 5,606,167 A | 2/1997 | Miller | |
| 5,847,398 A | 12/1998 | Shahar et al. | |
| 5,880,469 A | 3/1999 | Miller | |
| 5,982,838 A | 11/1999 | Vourvopoulos | |
| 6,215,122 B1 | 4/2001 | Clifford et al. | |
| 6,341,150 B1 | 1/2002 | Ivanov et al. | |
| 6,393,085 B1 | 5/2002 | Heller et al. | |
| 6,399,951 B1 * | 6/2002 | Paulus et al. | 250/370.13 |
| 6,444,944 B2 | 9/2002 | Schneider et al. | |
| 6,563,898 B1 | 5/2003 | Vourvopoulos et al. | |
| 6,928,131 B2 | 8/2005 | Olshansky et al. | |
| 7,151,815 B2 | 12/2006 | Ruddy et al. | |
| 7,362,842 B2 | 4/2008 | Leung | |
| 7,405,409 B2 | 7/2008 | Kearfott | |
| 7,461,032 B2 | 12/2008 | Heaton et al. | |
| 7,505,544 B2 | 3/2009 | Jestice | |
| 2002/0121603 A1 | 9/2002 | Wong et al. | |
| 2003/0161526 A1 | 8/2003 | Jupiter et al. | |
| 2004/0228433 A1 | 11/2004 | Magill et al. | |
| 2004/0251400 A1 * | 12/2004 | Moses et al. | 250/214 R |
| 2006/0140326 A1 | 6/2006 | Rowland et al. | |
| 2006/0210007 A1 | 9/2006 | Koskelo et al. | |
| 2007/0295911 A1 | 12/2007 | Sved | |
| 2008/0128631 A1 * | 6/2008 | Suhami | 250/370.09 |
| 2009/0095895 A1 | 4/2009 | Dent | |
| 2009/0114834 A1 | 5/2009 | Pekarsky | |

FOREIGN PATENT DOCUMENTS

| | | |
|---|---|---|
| JP | 02099811 A | 11/1990 |
| JP | 2001051094 A | 2/2001 |
| WO | WO98/57194 A1 | 12/1998 |
| WO | WO01/94984 A3 | 12/2001 |
| WO | WO03/040713 A1 | 5/2003 |
| WO | WO2004/043740 A3 | 5/2004 |
| WO | WO2005/008285 A1 | 1/2005 |
| WO | WO2006/016835 A1 | 2/2006 |

* cited by examiner

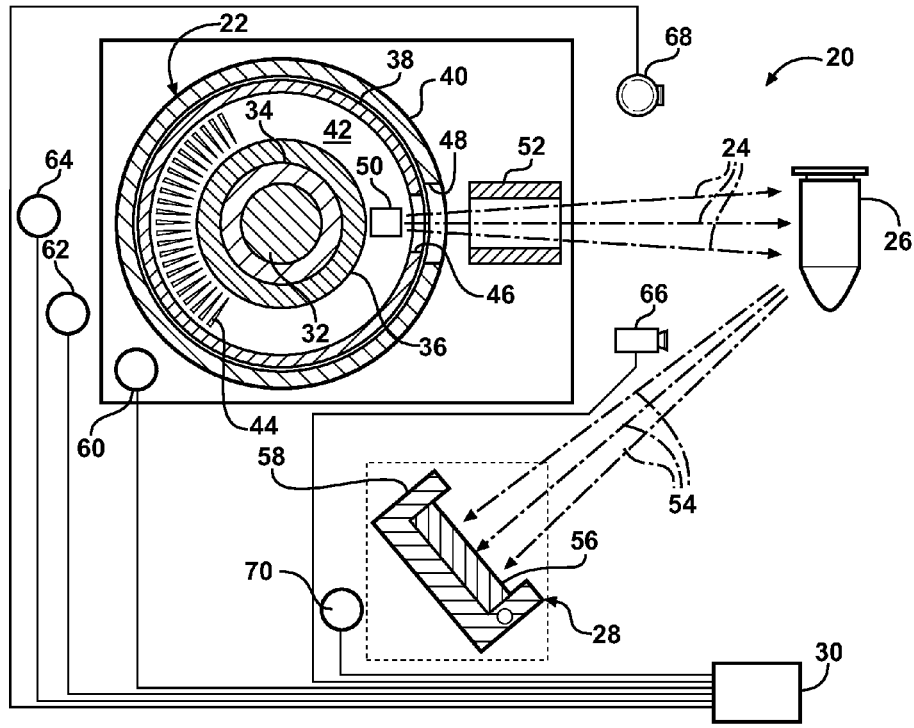
FIG. 4
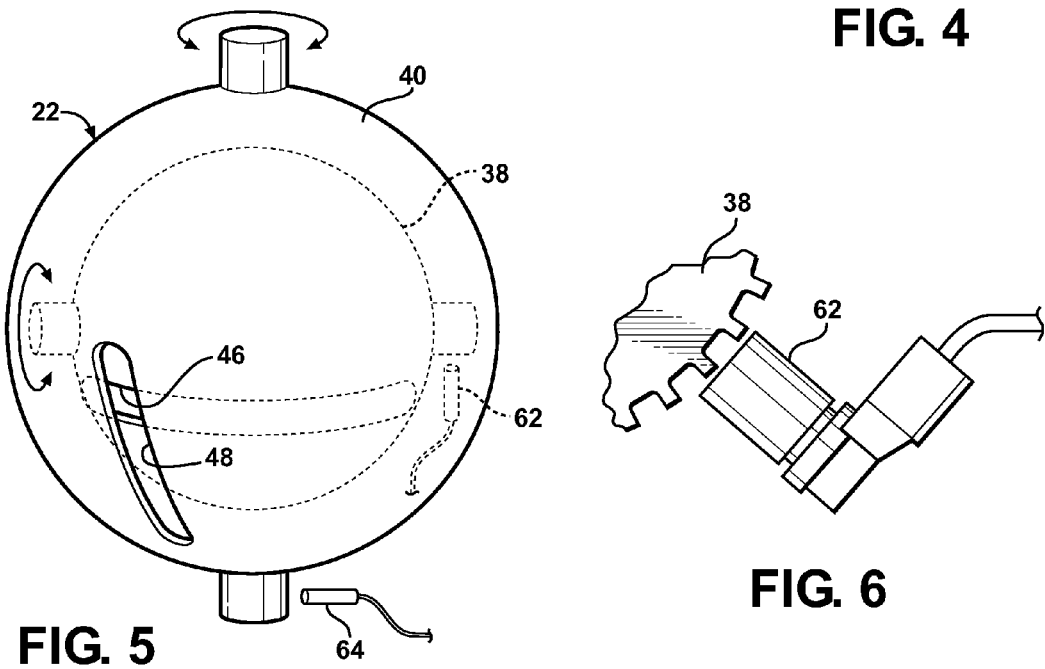
FIG. 5
FIG. 6

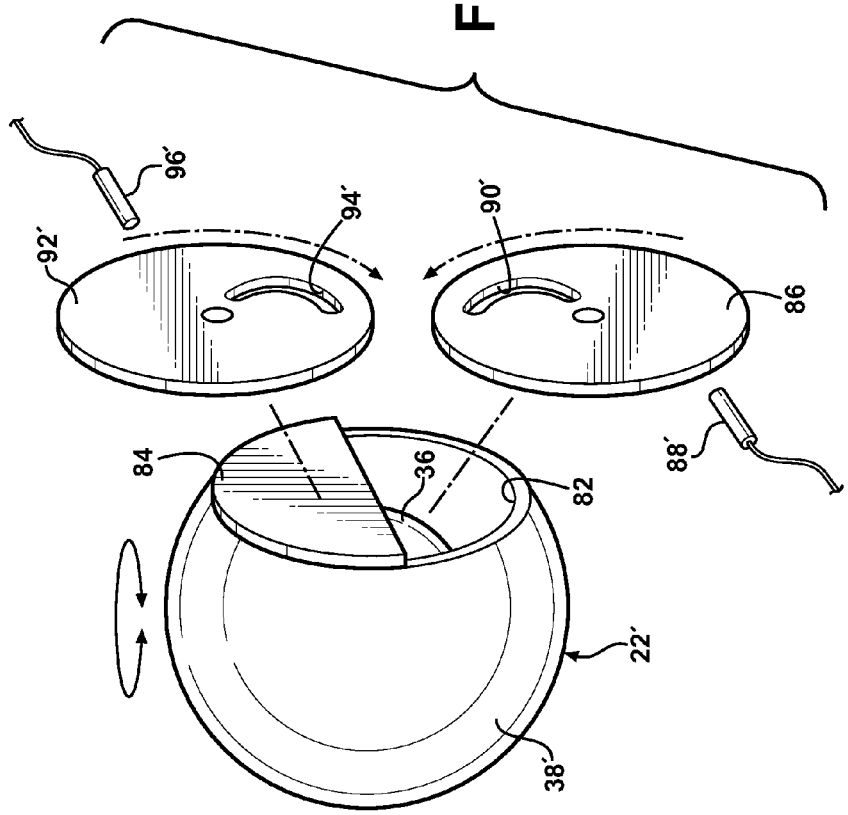
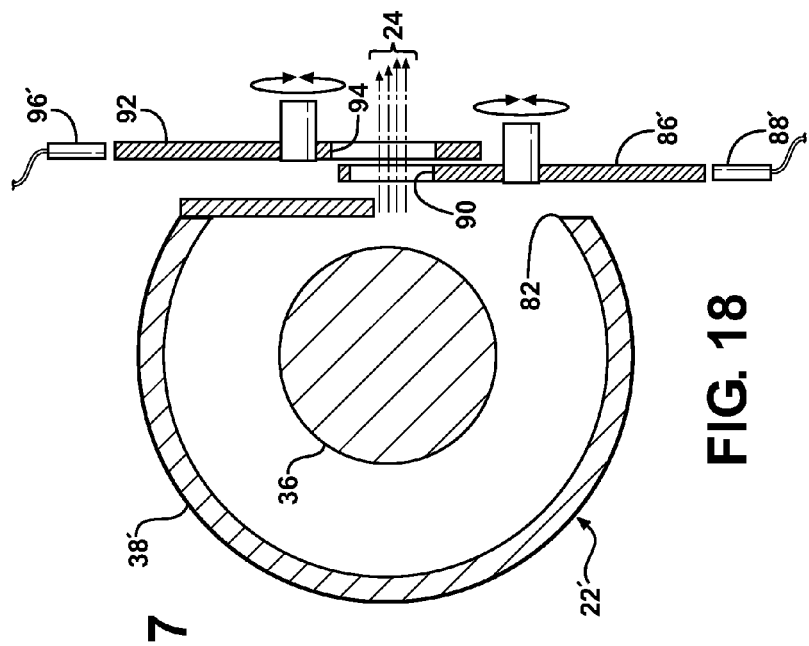
FIG. 17
FIG. 18

REMOTE DETECTION OF EXPLOSIVE SUBSTANCES

CROSS REFERENCE TO RELATED APPLICATIONS

This application is a Divisional of patent application Ser. No. 12/503,300 filed Jul. 15, 2009, which is a Continuation-In-Part of patent application Ser. No. 11/489,261 filed Jul. 18, 2006 and claims priority to Provisional Patent Application No. 61/168,244 filed Apr. 10, 2009, the entire disclosures of which are hereby incorporated by reference and relied upon.

BACKGROUND OF THE INVENTION

1. Field of the Invention

The present disclosure relates generally to the detecting of explosive substances, and more particularly to the detecting of explosive substances within remote targets and the locating of such targets using a pixilated gamma detector.

2. Related Art

An improvised explosive device (IED) is an explosive device placed or fabricated in an improvised manner, often used in unconventional warfare by terrorists or guerrillas. These IEDs are sometimes referred to as roadside or car bombs. The ever-increasing need to protect soldiers and civilians alike has resulted in demand for explosives detection systems that can detect and locate an IED at a significant standoff distance—ideally, near or beyond the IED's kill radius.

It is well known that explosives can be detected by bombarding them with thermal or slow neutrons of kinetic energy levels of approximately 0.026 eV, then detecting the resulting gamma rays. The vast majority of conventional chemical explosives are nitrogen-14 (14N) rich, while Special Nuclear Materials (SNMs) may contain Plutonium-239 (239Pu), Uranium-235 (235U), or, both as key ingredients. Each of these constituent elements, 14N, 239Pu, and 235U, as well as other materials of interest in detecting improvised explosives, for example, chlorine, copper, and aluminum, among others, radiates its own characteristic gamma ray emission spectrum when dosed with thermal neutrons.

For instance, militarily significant conventional chemical explosives, which constitute by far the largest threat to human life in terms of the frequency of occurrence, historical lethality, and ease of procurement and use, contain very high densities of nitrogen, principally nitrogen-14. Nitrogen-14, when bombarded by a thermal neutron, emits a strong gamma ray with energy 10.83 MeV as follows:

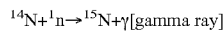

$$^{14}N + ^{1}n \rightarrow ^{15}N + \gamma \text{[gamma ray]}$$

The gamma ray emission is isotropic in that it can be emitted in any direction, and its trajectory is uncorrelated to the trajectory of the incident thermal neutron. High gamma ray fluxes are interpreted as explosives detection events. This technique is known as Thermal Neutron Activation Analysis (TNAA).

TNAA is a well-known technique for explosives detection and other types of materials analysis. However, the majority of TNAA technology has been directed at explosives detection in luggage and at landmine detection. Both applications operate in environments with complicating factors that limit the success of TNAA. Many common items found in luggage, such as nylon sweaters, are rich in nitrogen. This reduces the signal-to-noise ratio (SNR), which increases the false alarm rate and lowers the overall detection rate. Explosives distributed in small pieces in luggage also reduce the SNR and the detection rate in TNAA. Likewise, the most significant issue with landmine and buried explosives detection is the presence of significant amounts of silicon-29, which constitutes up to 5% of native silicon, and which emits gamma rays at 10.6 MeV under thermal neutron dosing. This emission (noise) competes with the gamma rays from nitrogen at 10.83 MeV (signal), reducing the SNR, increasing the false alarm rate, and decreasing the overall detection rate. Furthermore, the reduced SNR in both applications translates into increased inspection times and decreased throughout.

By contrast, in accordance with embodiments of the present invention, the proposed use of TNAA for IED detection operates in more conducive environments. First, the most deadly IEDs contain significant amounts of explosives, and hence, of nitrogen, since they are very large compared to anti-personnel land mines or to bombs in luggage. Thus, the targeted signal is high compared to competing signals from other noise sources from environmental nitrogen-14 and silicon-29. This has the effect of improving the SNR, decreasing the false alarm rate, and increasing the overall detection rate. Second, IEDs are often placed at or above the ground or buried with shallow overburden when compared to their explosive weight; they are often buried in trash piles or placed near concrete or dirt roads. Although silicon is present in these environments, its effect is significantly smaller than that in the case of buried antipersonnel mines with amounts of explosives measured in ounces. A typical IED is a command detonated device whose primary component is one or more HE (high explosive) 155 mm (U.S./NATO) or 152 mm (Soviet/WTO/Indigenous copy) (diameter) artillery rounds consisting of a metal casing filled with high explosive and measuring about 450 mm long. Increasingly, so-called "home made explosives" [HMEs] are also found, often consisting of ammonium nitrate plus fuel oil, urea nitrate, and similar nitrogen-rich compounds.

More importantly, there is presently no device for effectively detecting and locating IEDs at a standoff distance. Landmine detection and explosives detection in luggage both examine targets at close proximity. Therefore, a further object of the present invention is to detect IEDs using TNAA under different conditions, and thereby significantly reduce friendly and civilian casualties. Still further objects and advantages will become apparent from a consideration of the ensuing description and drawings.

SUMMARY OF THE INVENTION

The present invention comprises a method and apparatus for locating concealed, hostile targets at a remote distance by inducing, and then detecting, gamma rays from the target. The apparatus comprises a neutron source for producing a neutron beam capable of generating gamma rays upon interaction with a target. A beam former is provided for directing a neutron beam from the neutron source along a vector toward the search area. A gamma ray detector detects gamma rays emanating from the target and search area. The gamma ray detector includes a plurality of gamma sensing elements for independently detecting gamma ray energy level from a target in the search area to help spatially locate the target from a remote distance by correlating both energy and trajectory of incoming gamma rays.

The subject invention is distinguished from prior art gamma ray detector devices of this type in that it is a pixilated detector capable of independently sensing distinct gamma ray phenomenon. The use of multiple, independent sensor elements allow position information to be correlated thus improving accuracy in the determination of both energy and trajectory of incoming gamma rays.

BRIEF DESCRIPTION OF THE DRAWINGS

These and other features and advantages of the present invention will become more readily appreciated when considered in connection with the following detailed description and appended drawings, wherein:

FIG. 4 is a schematic representation of the subject apparatus for detecting remote explosive substances according to one embodiment of this invention;

FIG. 5 is a simplified, perspective view showing one possible configuration for the shield and beam forming features of this invention wherein a first rotatable shield surrounds a neutron source and includes a generally horizontally arranged elongated aperture and a second rotatable shield, generally spherical in shape, surrounding the first, inner shield whereby the second rotatable shield has an elongated, generally vertically extending aperture which overlaps the aperture in the first, inner rotatable shield with the overlapping region establishing the vector along which a neutron beam projects;

FIG. 6 is an enlarged, fragmentary view of one exemplary embodiment of a position sensor (or "encoder") which may be used in connection with the subject invention to monitor the instantaneous vector of the neutron beam;

FIGS. 9A and 9B represent simplified, cross-sectional views of the embodiments of FIGS. 7 and 8, wherein FIG. 9A represents the reticule at a position wherein the neutron beam is sealed within the shielding structure because the aperture in the reticule has been moved to a closed position and FIG. 9B represents a condition of the reticule wherein its aperture has been moved to an open position, so as to direct a neutron beam from the neutron source along a vector toward the search area;

FIG. 17 is an exploded view of yet another alternative embodiment of the shielding system wherein two, independently rotatable reticules are supported on independent axes of rotation;

FIG. 18 is a cross-sectional view of the embodiment illustrated in FIG. 17; and

DETAILED DESCRIPTION OF THE PREFERRED EMBODIMENT

Figure 1:
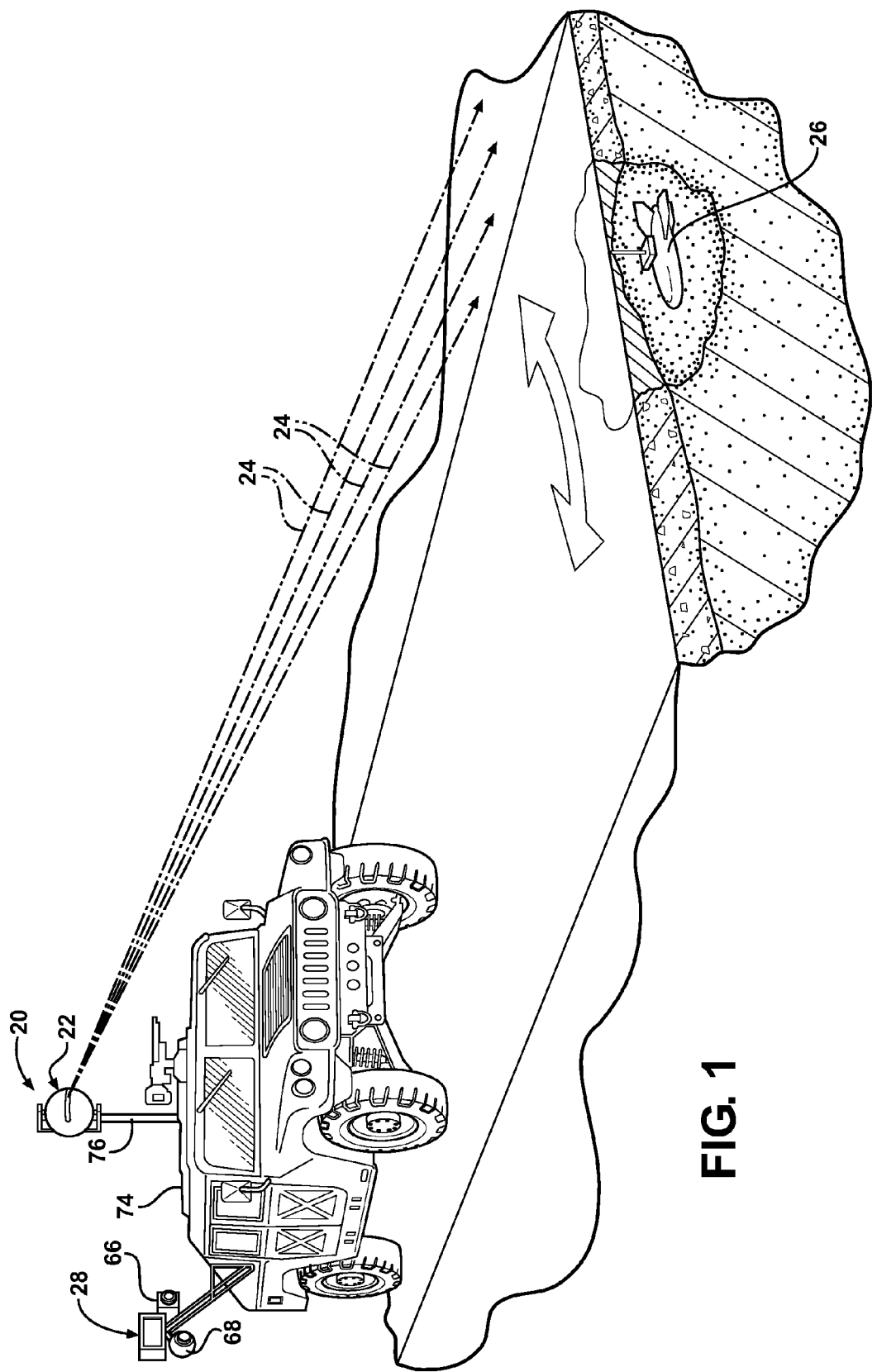
FIG. 1 is a perspective view showing one exemplary embodiment of the subject invention wherein the apparatus is carried in a land vehicle such that the neutron source is supported in a position for scanning a search area which, in this case, is a roadway having buried therein an improvised explosive device (IED)
Figure 2:
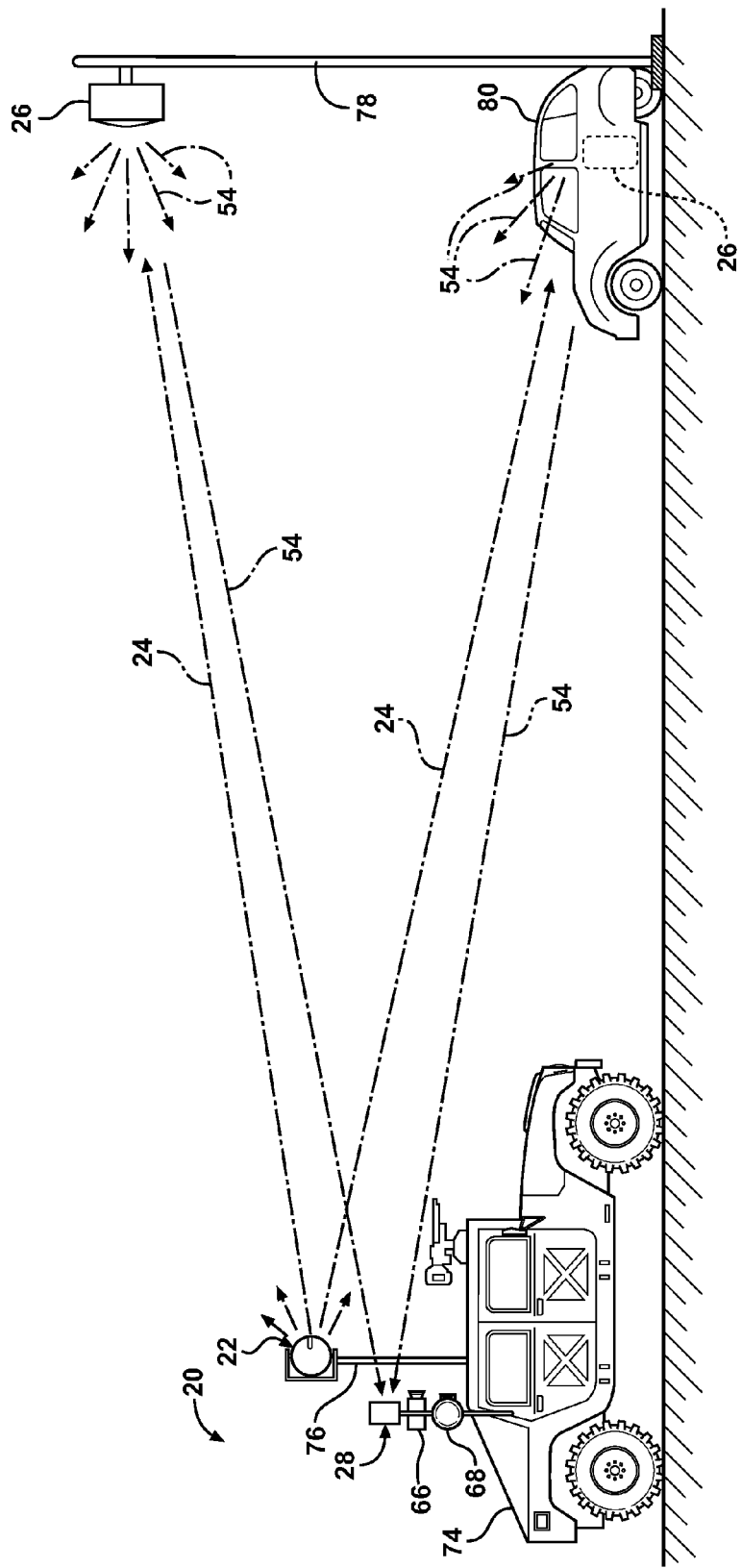
FIG. 2 is another simplified depiction of the subject invention wherein a vehicular mounted embodiment of the apparatus scans a search area to identify hostile targets at various elevations from a standoff distance.

FIGS. 1, 2 and 4 illustrate graphically an apparatus 20 for detecting remote explosive substances in accordance with one embodiment of the present invention. (Conventional elements, such as housings, mountings, supports, electrical power supplies, etc. are shown in greatly simplified form or omitted altogether for ease of illustration.) The apparatus 20 has a neutron beam generator 22, which directs a neutron beam 24 across a search area that may contain one or more remote suspicious targets 26. A target 26 may be generally defined as a hostile, hidden or suspicious object that has the potential to harm people or property. In its most common embodiment, a target 26 is an improvised explosive device (IED) or bomb. The apparatus 20 also includes a gamma ray detector 28 and a plurality of data collection modules and sensors (described in more detail below), along with a detection processing module 30. These several main components of the apparatus 20 are first broadly described by their sub-components, and then each sub-component is described in further detail.

Reference herein to "one embodiment," "an embodiment," "some embodiments," or similar formulations, means that a particular feature, structure, operation, or characteristic described in connection with those embodiments, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

The neutron beam generator 22 directs a neutron beam 24 along a vector towards the search area. As shown schematically in FIG. 4, a fast neutron source 32 is surrounded by an optional neutron amplifier 34, which increases the number of fast neutrons prior to their moderation. The optional neutron amplifier 34 is surrounded by a neutron moderator 36, which slows some or all of the fast neutrons to thermal energies. A movable, preferably rotatable, neutron shield 38 and a second optional movable (preferably rotatable) neutron shield 40 enclose a void 42. The optional second neutron shield 40 at least partially overlaps the first neutron shield 38. The neutron moderator 36, optional neutron amplifier 34, and the fast neutron source 32 are contained within the void 42. Also located in the void 42 is an optional neutron focusing element 44. Each of the movable neutron shields 38, 40 defines an aperture, apertures 46 and 48 respectively, which cooperate as a beam former to direct the neutron beam 24 along a vector. In other words, the overlap between the first 46 and second 48 apertures allows a projected beam 24 of neutrons to escape from the generator 22 so that the beam 24 can be scanned across a search area suspected to contain one or more hostile targets 26. An optional neutron amplifier 50 within the void 42 and immediately before the overlapped region of the apertures 46, 48 can be used to increase the number of neutrons in the neutron beam 24. An optional supplemental neutron beam-forming component 52, situated along a path of the neutron beam 24, can be used in cooperation with the apertures 46, 48 to further focus the neutron beam 24.

The gamma ray detector 28 is used to detect gamma rays 54 emitted from the remote target 26. Preferably, the gamma ray detector 28 is spaced apart from the neutron beam generator 22 by several meters, e.g., three meters. As shown in FIGS. 2 and 3, substances of interest within the remote target 26 will radiate gamma rays 54 with characteristic emission spectra when bombarded by neutrons. A portion of these gamma rays 54 are intercepted by a gamma ray spectrometer 56 portion of the gamma ray detector 28. The spectrometer 56 is shielded from nuisance gamma rays originating from sources other than the remote target 26 by a gamma ray shield 58.

Neutron source status information is collected from a plurality of sensors within or near the neutron source 32 and reported via data channel 60. Furthermore, two position sensors 62 and 64, one for each shield 38, 40, monitor the instantaneous positions of the respective shields 38 and 40, and therefore are capable of discerning the vector position or orientation of the neutron beam 24 at any moment in time. An optional imaging sensor (e.g., a video camera or its functional equivalent) 66 may be provided, along with a distance sensor 68, and a detection data collection module 70. The two position sensors 62, 64 determine the positions of the two apertures 46, 48, respectively. Each of the two position sensors 62, 64, the data channel 60, the optional imaging sensor 66, and the distance sensor 68 collects and transmits its data to the detection processing module 30. The detection data collection module 70 collects and transmits the data from the gamma ray detector 28 to the detection processing module 30. As shown in FIG. 6, the position sensor 62 (and likewise 64) can be of the well-known encoder-type which may be either separately fitted to some movable portion of either shield 38, 40, or may be incorporated directly into the motor drive system which controls movement of the respective shields 38, 40.

The optional imaging sensor 66 also allows for the system to be switched off temporarily, either manually or automatically, if the imaging sensor detects the images of civilians or other sensitive elements in the scene downrange of the neutron beam. After determining that the area is clear of sensitive elements, the beam can be switched on again, either manually or automatically.

The detection processing module 30 processes data, including but not limited to neutron source status information collected from a plurality of sensors within the neutron source and reported via data channel 60, position data provided from the two position sensors 62, 64, the optional imaging sensor 66, the distance sensor 68, and the detection data collection module 70. Based on the provided data, the detection processing module 30 determines whether the remote target 26 contains any substances of interest, as well as the location of the remote target 26 by inference from the orientation of the beam vector at the moment in time when the gamma ray detector 28 senses the incoming gamma rays 54 from the target 26.

As shown in FIG. 4, a compact fast neutron source 32 may be preferred because it is portable, simple to construct, and a convenient source of significant neutron flux. Alternative types of such neutron sources 32 may be used, however, in appropriate circumstances. For portable field operations, the maximum dimension of the neutron source 32 should be minimized to the extent practical. Numerous types of known fast neutron sources have a maximum dimension smaller than approximately 100 cm, as is desirable here, including but not limited to spontaneous fission radioisotopes, accelerator-based sources, alpha reactions, photofission, and plasma pinch. Some embodiments have spontaneous fission neutron sources using radioactive isotopes, such as Californium-252. In some embodiments, neutrons are produced by sealed tube or accelerator-based neutron generators. These generators create neutrons by colliding deuteron or triton beams into targets containing deuterium or tritium, causing fusion with attendant release of neutrons. Some embodiments have alpha reaction sources, in which alpha particles from alpha-radioactive isotopes, such as polonium or radium, are directed into targets made of low-atomic-mass isotopes, such as beryllium, carbon, or oxygen. An embodiment may also use photofission sources, including beryllium, in which gamma rays are directed into nuclei capable of emitting neutrons under certain conditions. Another kind of neutron source is the plasma pinch neutron source or fusor source, in which a gas containing deuterium, tritium, or both is squeezed into a small volume plasma, resulting in controlled nuclear fission with attendant release of neutrons. Pulsed neutron generators using the fusor technique are also commercially available.

As shown in FIG. 4, the fast neutron source 32 is surrounded by a conventional neutron amplifier 34, which increases the number of fast neutrons prior to their moderation by the neutron moderator 36. Neutron amplifiers 34 emit more neutrons than they absorb when irradiated by neutrons. Known materials used as neutron amplifiers include, but are not limited to, thorium, lead, beryllium, americium, and non-weapons-grade uranium and plutonium. Since the most common neutron amplifiers 34 operate on high energy neutrons, some embodiments may include one or more high energy neutron amplifiers or premoderator amplifiers, thereby maximizing the number of neutrons in the neutron beam for a given power dissipation, physical size, cost, and weight. Other types of neutron amplifiers 34 which may be used for this invention operate on thermal energy neutrons. Therefore, some embodiments may include a thermal neutron or postmoderator amplifier 50 as well.

Because the neutrons produced by the fast neutron source 32 and the optional premoderator amplification stage 34 have energies tens to hundreds of millions of times larger than the energies required for thermal neutrons in the present apparatus 20, some or all of the neutrons may be slowed down to thermal energies—energies in thermal equilibrium with nominally room temperature surroundings (~0.026 eV)—by the neutron moderator 36. This process is known as neutron moderation or thermalization.

Neutron moderation is conventionally achieved by scattering or colliding the neutrons elastically off light nuclei that either do not absorb them or else absorb them minimally. Since the light nuclei are of the same rough order of magnitude in mass as the neutrons themselves, each neutron imparts significant energy to each nucleus with which it collides, resulting in rapid energy loss by the neutrons. When the neutrons are in thermal equilibrium with their surroundings, a given neutron is just as likely to get an energy boost from a slightly faster-than-average nucleus as it is to lose a slight amount of energy to a slightly slower-than-normal molecule. As a result, thermal neutrons remain thermal. Among the most effective moderator nuclei are deuterium and carbon-12, since they are light and do not absorb appreciable number of neutrons. Light hydrogen is also an effective moderator because, although it absorbs a small number of neutrons, its extremely low atomic weight of 1 allows for extremely efficient moderation. Polyethylene, containing carbon and light hydrogen, is thus an effective moderator compound.

As shown in FIG. 4, neutron moderation can be achieved by passing fast neutrons emanating from the source 32 through the neutron moderator 36. Some of the optional types of neutron sources mentioned above produce neutron beams (anisotropic sources), while others produce neutrons with trajectories radiating equally in all directions (isotropic sources). Nevertheless, the effect of moderation, with its numerous elastic scattering events per moderated neutron, yields a fairly isotropic distribution of neutron trajectories. For this reason, one particularly desirable shape for the neutron moderator 36 is a hollow sphere with the fast neutron source 32 and the optional premoderator amplifier 34 inside. For a deuterium oxide ("heavy water") moderator 36, the thickness required to moderate nearly 100% of deuterium-deuterium fusor-source neutrons having energies of the order of 2.45 MeV to thermal energies is of the order of 30 cm; for a graphite moderator, the thickness is greater. See, e.g. G. Friedlander et al, Nuclear and Radiochemistry (3d ed., Wiley and Sons 1981). The actual moderator 36 may be thinner than this, if some energetic neutrons are to be left in the beam 24.

Simply sending thermal neutrons into space in all directions would not allow a target of interest to be located spatially within a search area. For this reason, it is useful to scan the surrounding landscape with neutron beam 24. The neutron beam 24 is formed by enclosing the neutron moderator 36 with a movable neutron shield 38 having an aperture or reticule 46, which could be variable in both shape and size. The neutron shield 38 could be fabricated of one or more substances known to absorb neutrons, such as boron, lithium, cadmium, hafnium, or gadolinium. In some embodiments, described in greater detail below, a stationary neutron shield is filled with one ore more rotatable reticules. Embodiments shown in FIGS. 1, 2, 4 and 5 include a second, outer, movable neutron shield 40 defining a second aperture 48. Each neutron shield 38, 40 may move, e.g., rotate or translate, independently at different speeds or remain fixed, or may shift or pivot back-and-forth in response to a predetermined scanning methodology.

Figure 3A:
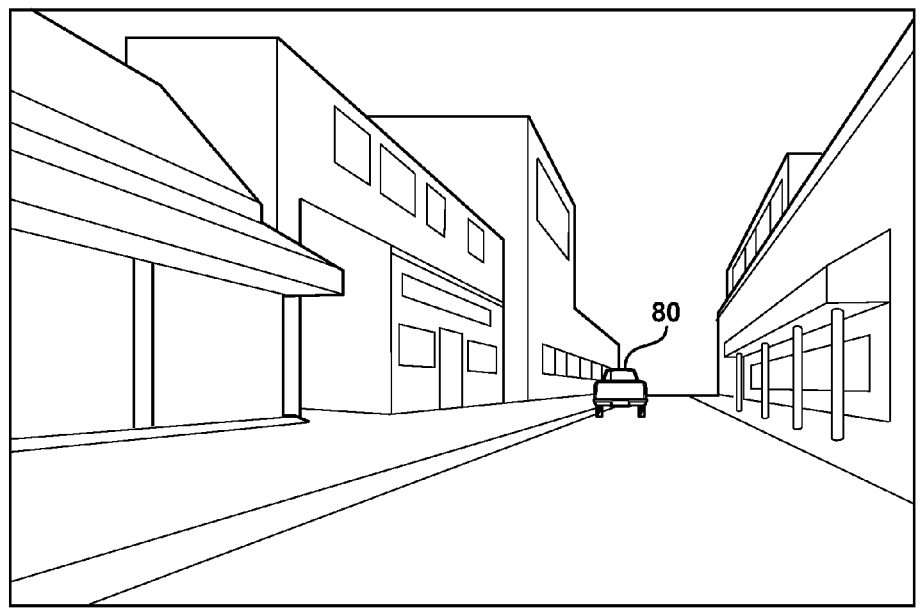
FIGS. 3A and 3B show, respectively, forward-looking perspective views as might be encountered by the driver of a vehicle carrying the apparatus and implementing the method of this invention wherein building structures line the sides of a roadway and a parked vehicle lies ahead, with FIG. 3B depicting in exemplary fashion a scanning path for a neutron beam according to the subject invention with a flash-like response representing the generation of gamma rays which occurs when the neutron beam interacts with substances of interest, e.g., nitrogen, in a hostile target.
Figure 3B:
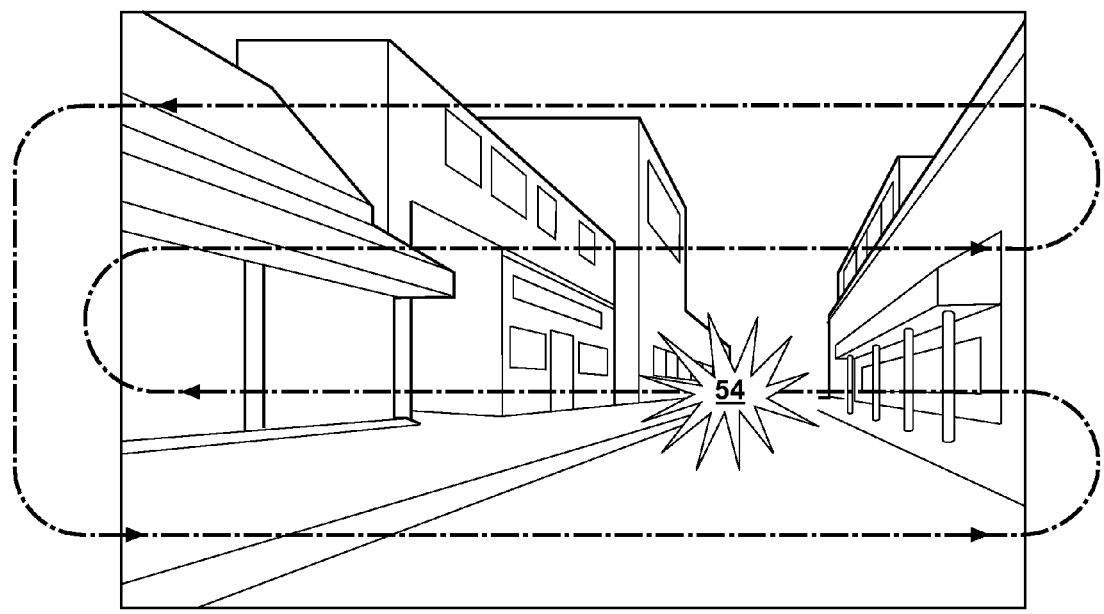

FIG. 3A is an exemplary perspective view as may be perceived by a person operating the subject apparatus 20. In the most practical embodiment of this invention, the apparatus 20 is mounted on a mobile carrier 74 which, as shown in FIGS. 1 and 2, may take the form of an armored land vehicle. However, other carrier 74 embodiments can be envisioned, including tailored land vehicles, marine vessels, aircraft and the like. In other words, the carrier 74 may comprise any structure capable of supporting the neutron source 32 opposite a search area. Thus, in FIG. 3A, the perspective view may be that of an area suspected to contain one or more hostile targets such as bombs or explosive devices which could be hidden in any conceivable location below the ground, on the ground or above the ground. Thus, as the search area is approached, an operator of the apparatus 20 upon perceiving the view presented in FIG. 3A, will not be able to accurately predict where a target 26 may reside. For this reason, the apparatus 20 is constructed so that the neutron beam 24 can be scanned across the search area. For example, the circuitous dashed lines in FIG. 3B represent a methodical, serpentine-like back-and-forth scanning of the search area with the neutron beam 24 over a defined period of time. In other words, if for example a motor carrier 74 were stationary, the back-and-forth scanning of the search area may take the form illustrated in FIG. 3B. Of course, other scan path methodologies can be used including up and down, circular, zig-zag or other scanning patterns as may be deemed appropriate. In these examples, a hostile target, e.g., IED, is hidden within a vehicle 80 parked along the roadside in the search area. When the neutron beam 24 scans across the vehicle 80 concealing a target 26, a flash of gamma rays 54 is produced and detected by the gamma ray detector 28. The position sensors 62, 64 are effective to specify the orientation of the neutron beam vector at the moment the gamma rays 54 are detected by the detector 28 so as to locate the target 26 in the search area.

The void 42 and the neutron focusing element 44 conserve the neutrons and thus maximize the number of neutrons in the neutron beam 24. Thermal neutrons radiate isotropically; that is, they radiate in all directions, into a solid angle of $4\pi$ stearadians—the solid angle of a sphere. However, the goal is to produce a fairly narrow thermal neutron beam, e.g. of the order of 0.1 radians wide and 0.3 radians high, or approximately 0.03 stearadians. As a result, most of the neutrons are wasted—approximately 399 out of 400 of them. Therefore, the present apparatus may use one or more techniques to focus the neutrons, so as to conserve potentially wasted neutrons. To accommodate such focusing, the apparatus 20 may include the optional void 42, which can be nearly zero to many centimeters thick. In recent years, numerous schemes for creating thermal neutron lenses have been described, including but not limited to capillary optics, silicon lenses, beryllium diffraction lenses, and nickel reflectors. The apparatus 20 may use one or more of such neutron focusing elements 44 to conserve neutrons. The exemplary focusing element 44 depicted in FIG. 4 may be a beryllium diffraction lens.

The neutron amplifier 50 at the aperture 46 increases the number of thermal neutrons in the neutron beam 24. Certain elements, such as thorium, emit more thermal neutrons than they absorb when dosed with thermal neutrons, effectively acting as neutron amplifiers 50. Therefore, the present invention may optionally include a neutron amplifier 50 to further enhance its performance.

The supplemental neutron beam-forming component 52 can be used to focus the neutron beam 24 more precisely in the event the apertures 46, 48 alone do not provide the desired degree of focus. Neutron beam-forming components can be made with materials, such as nickel, that reflect neutrons at very low incident angles. The present invention may include a tubular or other similarly shaped neutron beam-forming component 52 to further enhance its performance.

As shown in FIGS. 1-4, the neutron beam 24 is directed toward a search area suspected to contain a remote target 26 containing explosive materials with, in this case, large amounts of nitrogen or other substances of interest. Although some of the neutrons are scattered, absorbed, or reflected by air, a significant portion of the neutrons is estimated by simulation to reach a remote target 26 tens of meters away. Neutrons of all energies penetrate, to at least some degree, virtually all materials commonly used to shield explosives, including steel, glass, and many materials containing plastics and concrete. For instance, to reduce the flux of an incident thermal neutron beam by half would require a thickness of approximately 10 cm of steel, 15 cm of lead, 30 cm of aluminum, sand or concrete, 40 cm of glass, or 25 cm of water. As a result of the neutron bombardment, gamma rays 54 radiate isotropically from the remote target 26 similar to the illustrations in FIGS. 2 and 3B. These fairly high energy 10.83 MeV gamma rays 54 also penetrate, to at least some degree, virtually all materials commonly found to shield explosives.

A portion of these gamma rays 54 are intercepted by a gamma ray detector 28 fitted with one or more detector elements acting collectively as a gamma ray spectrometer 56. The detector 28 and its associated system are configured to determine when the gamma rays 54 meet at least one predetermined condition. These conditions may change from location to location and depending on the particular characteristics of the target 26. For examples, the predetermined conditions can include energy distribution values, background/nuisance noise characteristics, count rate changes, and angle of incidence for the incoming gamma rays 54. To state it more generally, the predetermined condition for which the detector 28 is watching will involve at least one but more typically several mathematical formulas, algorithms or comparisons that indicate a substance of interest in the remote target 26. As but one specific example, the detector 28 may be configured to determine gamma rays with energies above a threshold value which, by way of example, could be set at 8 MeV.

The spectrometer 56 is protected from nuisance gamma rays originating from sources other than the remote target 26 by a gamma ray shield 58 which could take the form of a collimator, constructed of lead or other gamma ray shielding substances. The gamma ray spectrometer 56 typically resolves gamma ray energies in the 8-11 MeV range, i.e., above the threshold value, with a minimum precision of the gamma ray energy needed to distinguish between return gamma rays 54 from different substances of interest. Portable gamma ray spectrometers 56 capable of resolving energies at that level and with that precision are often constructed of either scintillators, such as sodium iodide (NaI), cesium iodide (CsI) (both with and without various dopants, such as thallium), or various plastics, or of semiconductors such as high purity germanium (HPGE) or cadmium-zinc-tellurium (CZT), with thicknesses varying from several millimeters to several centimeters. However, detectors 28 constructed of other materials may also be used. The typical method by which gamma rays are detected in these spectrometers is a plurality of pair production, Compton scattering, and conventional scintillation.

Figure 19:
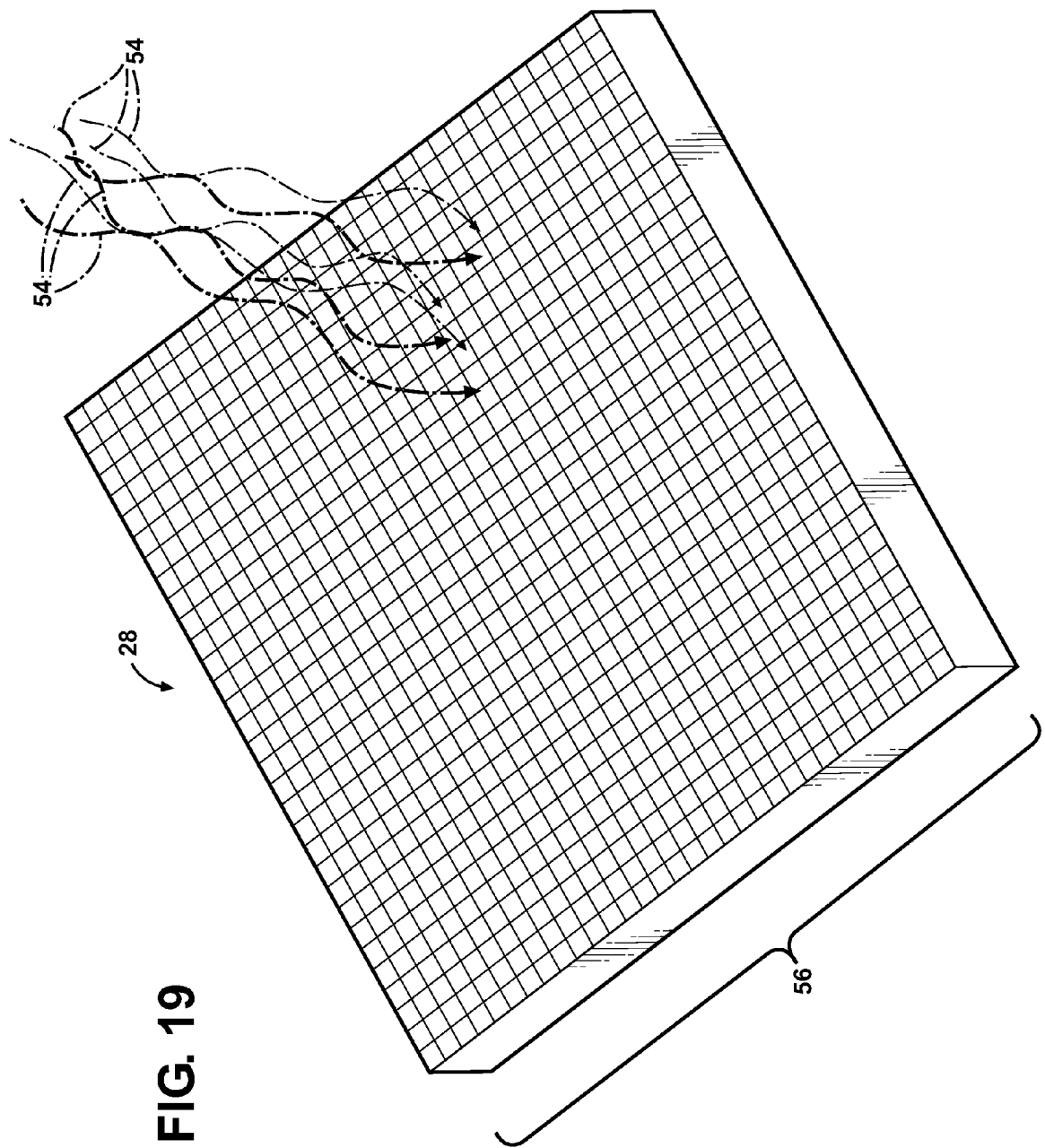
FIG. 19 is a simplified, perspective view of the pixilated gamma ray detector of this invention wherein the incident angle of incoming gamma rays can be independently detected by a plurality of gamma sensing elements to help spatially locate a target from a distance by correlating both energy and trajectory of the incoming gamma rays.

The gamma ray detector 28 may employ a spectrometer 56 design composed of a single element, which might be referred to as a "monolithic" detector. However, as shown in FIG. 19, it is possible that the detector 28 may be fitted with multiple sensing elements in its spectrometer portion 56 which are capable of independently sensing incoming gamma rays 54. This latter type of detector 28 may be referred to as a "pixilated" detector. Gamma rays 54 of the energies of interest, e.g., including those above 1 MeV, interact with matter in several ways. Each interaction way results in a phenomenon that is detectable. At higher energies, such as 10.83 MeV, one type of typical interaction involves the creation of an energetic electron-positron pair. These particles transit the detector 28, scattering electrons and some nuclei as they do so, in a process known as Rutherford scattering. The Rutherford scatter events cause low energy photons to be produced. These can be detected by optical devices such as photo diodes, if they are produced in a transparent medium known as a scintillator. If they are formed in a semiconductor, they can produce varying electrical currents that can also be sensed. As the positron loses energy it ultimately annihilates with an electron in the environment, creating two 511 KeV gamma rays that can be detected by Compton scatter events by either optical or electronic processes as just described. Therefore, the use of multiple, independently sensed detector elements allow position information to be correlated to allow additional accuracy in the determination of both the energy and the trajectory of the incoming gamma rays 54. Therefore, by including a plurality of gamma sensing elements within the gamma ray detector 28, each sensing element capable of independently detecting and reporting gamma ray energy levels from a target 26 in a search area, it is possible to more accurately spatially locate the target 26 from a safe distance by correlating both the energy and trajectory of the incoming gamma rays 54.

Pair production consists of the creation of an electron-positron pair from the incident gamma ray 54 as it passes the environment of a nucleus. In such interactions, the energy of the gamma ray 54 is first converted into the rest mass of the electron and the positron (511 KeV each, for a total of 1.022 MeV), and the surplus gamma ray energy above this value is converted to equal amounts of kinetic energy for the electron and the positron. Thus, for a 10.83 MeV gamma ray, 1.022 MeV is given up to the rest mass of the electron-positron pair, and the remaining 9.408 MeV is divided equally between the electron and the positron, with the result that each has a kinetic energy of 4.704 MeV. The half-angle between the outbound trajectories of the pair is approximately equal to the ratio between the total energy of the gamma ray 54 and the total produced rest mass, expressed in radians. For the case of a 10.83 MeV gamma ray, this half-angle value is 0.094 radians, or 5.4° of arc, for a total of 10.8° total included angle between the outbound electron and positron. (The above discussion ignores the very small energy and momentum transferred to the nucleus in which the pair creation takes place.) Because they are anti-matter, positrons ultimately annihilate with electrons found in the detector, but the annihilation cross-section is extremely small at the high energies of this problem. The result is that both the electron and the positron lose energy by conventional Rutherford scattering with electrons (mostly) and nuclei (occasionally) in the detector, until the energy of the positron is low enough for it to have a non-negligible annihilation cross-section. When it finally annihilates, that event produces a pair of 511 KeV gamma rays that can be detected with a scintillation or solid-state detector. The energy from incident gamma rays that do not pair-produce, and lose energy via Compton scattering instead, is also detected with scintillation counters or solid-state detectors. The relative number and intensity of the detections allows for computing energy and flux by summing the energies associated with the events detected by these methods.

Knowledge of the included angle of the created electron-positron pair enables some embodiments to determine the incident angle of a detected gamma ray by using a pixilated detector 28, which senses the angular direction of the pair-production track left by the gamma ray as described above and shown in FIG. 19.

The gamma ray spectrometer 56 is preferably spaced, for example, 3 meters apart from the thermal neutron source 32 in order to minimize the neutron-irradiated air path seen by the spectrometer 56, thereby reducing background signal. The term for this arrangement is "bistatic" orientation. The spectrometer 56, neutron source 32, and the neutron shielding 38, 40 are typically mounted on a rotatable mast 76 or support on the carrier vehicle 74.

Simulations show that a thermal neutron beam of $3 \times 10^{10}$ neutrons per second will detect a 10 kilogram conventional explosive target 20 meters away in ⅓ of a second with an SNR of 1.5, using an optimal detector 28 with a frontal area of ½ meter by ½ meter. The apparatus 20 may work at ranges up to 30 meters.

In order to determine whether the remote target 26 contains any explosives, the gamma ray detection data collection module 70 collects and transmits the detected gamma ray data as a function of time from the gamma ray spectrometer 56 to the detection processing module 30. To further, i.e., more accurately, locate the remote target 26, the orientation of the neutron beam 24 is measured simultaneously with the determination that gamma rays 54 received at the detector 28 meet the predetermined condition(s). This can be accomplished by the position sensors 62, 64 which collect and transmit the positions of the two apertures 46, 48 as a function of time to the detection processing module 30 for further processing. The positions of the apertures 46, 48 may be defined by an azimuth and an elevation, and may be used by the detection processing module 30 to determine the vector of the neutron beam 24. Also, neutron source status information is collected from a plurality of sensors within or proximate to the neutron source 32 and reported via data channel 60 to the detection processing module 30.

In some embodiments, the detection processing module 30 may determine the elevation and azimuth of the remote target 26 based on the determined vector of the neutron beam 24. Optionally, a radar or other type of distance sensor 68 may be used to further identify the remote target's 26 approximate position based on the estimated distance, elevation, and azimuth. Other types of distance sensors 68 may rely on laser triangulation, phase angle analysis, acoustic feedback signals, and the like.

Another way to identify the approximate position of a remote target 26 is by computing the thermal neutron beam direction (i.e., vector relative to the carrier 74) and the incident angle of the detected gamma rays 54 as determined by the pixilated detector 28. If the two computed lines do not intersect, then the detected gamma rays 54 are likely nuisance gamma rays originating from sources other than the remote target, and the detection processing module 30 may ignore the detection as a background event. If the two computed lines intersect each other, the intersecting point is the estimated position of the suspicious target. In addition, images from the optional imaging sensor 66 may be used by the operator to rule out false detection in situations where the estimated position falls into a region of open space, thereby reducing the false alarm rate of the apparatus 20. In such situations, the detected gamma rays 54 are likely attributed to atmospheric nitrogen rather than an object containing explosives.

The detection processing module 30 may also use pattern recognition (via sensor 66) or other techniques to take into consideration other factors, such as time of detection, flight time of the neutrons 24 and gamma rays 54, and background noise levels. These data may further be converted to tactical decisions according to the user's concept of operations. Image data from sensor 66 may be used to monitor for the probability of sensitive entities in the search area, such as human beings or valuable property items that could suffer damage. When such sensitive entities are detected or probable, the neutron beam 24 can be altered by various techniques to avoid or mitigate harm. For example, the neutron beam 24 can be switched off, modulated, redirected or paused when the presence of a sensitive entity in the search area is probable.

As shown in FIGS. 1 and 2, a detection apparatus 20 as described above mounted on a mast 76 and projecting neutron beam 24 and receiving gamma rays 54 for use may be mounted on a manned or remotely controlled vehicle 74 traveling, e.g., at the head of a convoy to detect IEDs which could be hidden on a utility pole 78 or in a parked car 80 (car bomb) at standoff or near-standoff range—far enough ahead to allow for a traffic halt or evasive maneuvers prior to entering the IED's kill radius.

Figure 7:
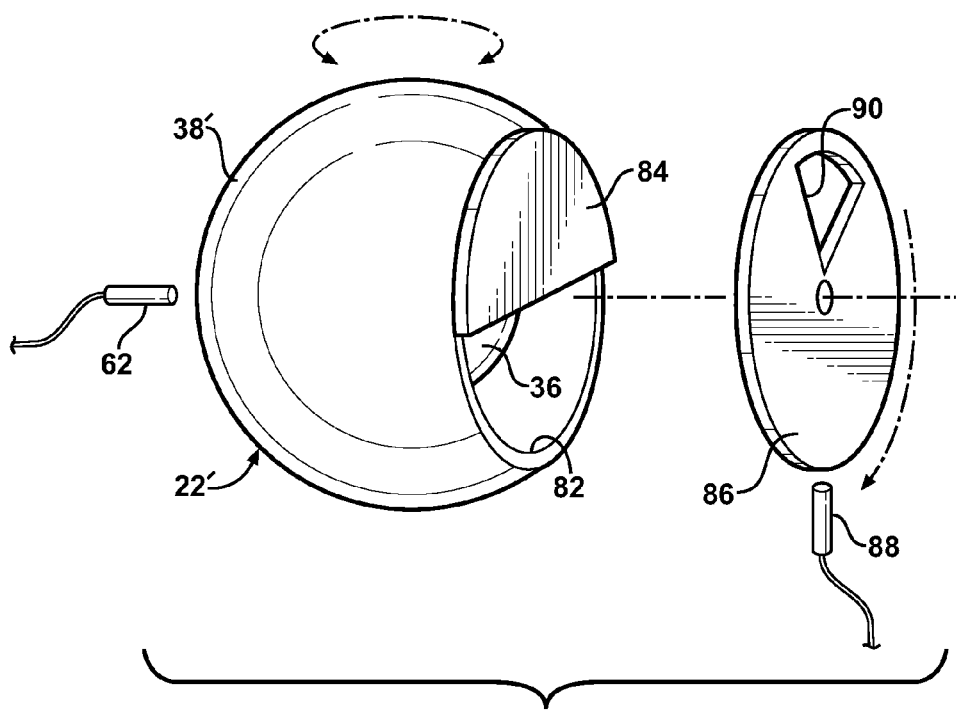
FIG. 7 is a perspective view of an alternative shield configuration showing a rotatable reticule having an aperture therein to establish the shape and direction of a projected neutron beam.
Figure 8:
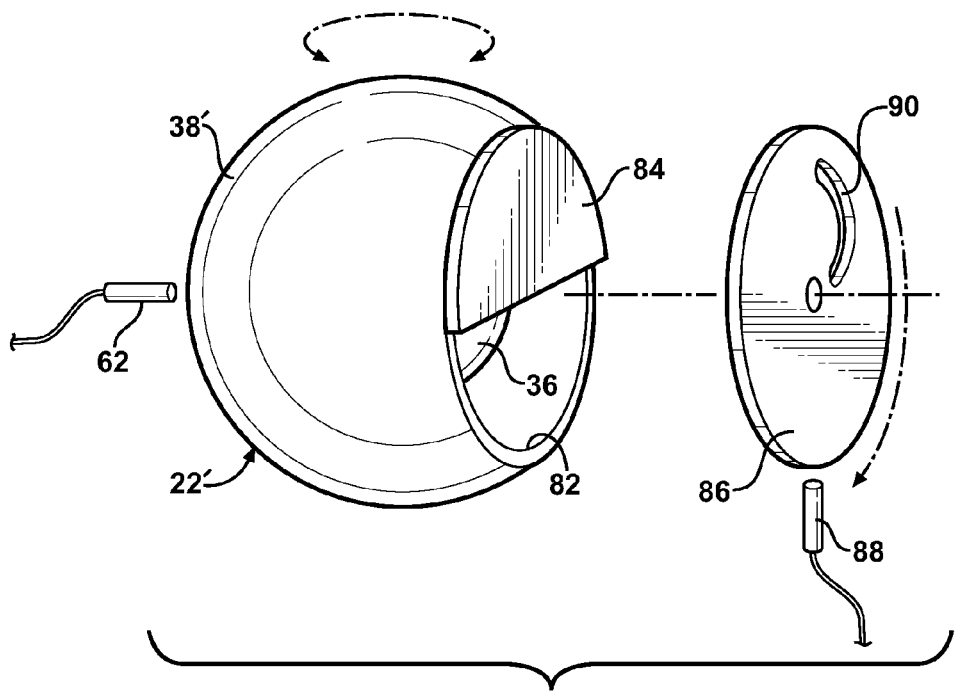
FIG. 8 is a view as in FIG. 7 showing an alternatively shaped aperture forming the rotatable reticule.

FIGS. 7-18 show various alternative arrangements for the neutron shielding system so as to achieve a controlled scanning path for the neutron beam 24. FIGS. 7 and 8 show an embodiment where the first neutron shield 38' includes a large opening 82 partially covered by a planar, semi-circular shutter 84. The first neutron shield 38' can either be support, such as on a mast 76 for example, for rotation relative to the carrier 74 or fixed. In this example, it is assumed that the first neutron shield 38' is rotatable as indicated by the directional arrow above and by the position sensor 62. The shutter 84 is preferably fixed (i.e., non-movable) relative to the first shield 38', and can take many other shapes or forms and have additional holes as needed to achieve desired results. In these examples, the second rotatable shield takes the form of a planar reticule 86 whose movements are monitored by position sensor 88. The reticule 86 includes an aperture 90, the shape of which is shaped and sized to deliver a neutron beam 24 with a scan speed, angular size, and within scan limits dictated by the problem addressed by the apparatus. The aperture 90 shape is adaptable or configurable so as to achieve a desired property or performance requirement that could be specific to each application for the device. For simplicity, additional shielding to prevent the leakage of neutrons due to the thickness of the reticule 86 is not shown. It will be understood that the reticule 86, as well as the shutter 84, could take non-planar shapes without departing from the described functionality.

Figure 9A:
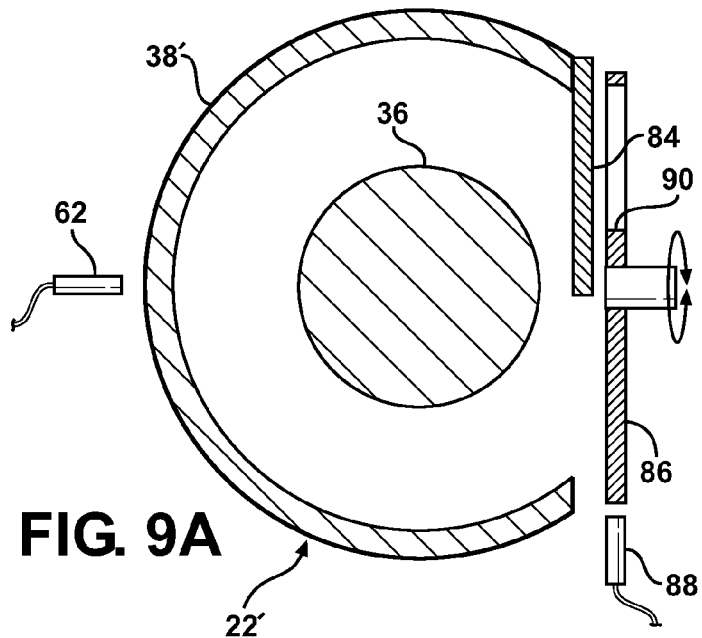
Figure 9B:
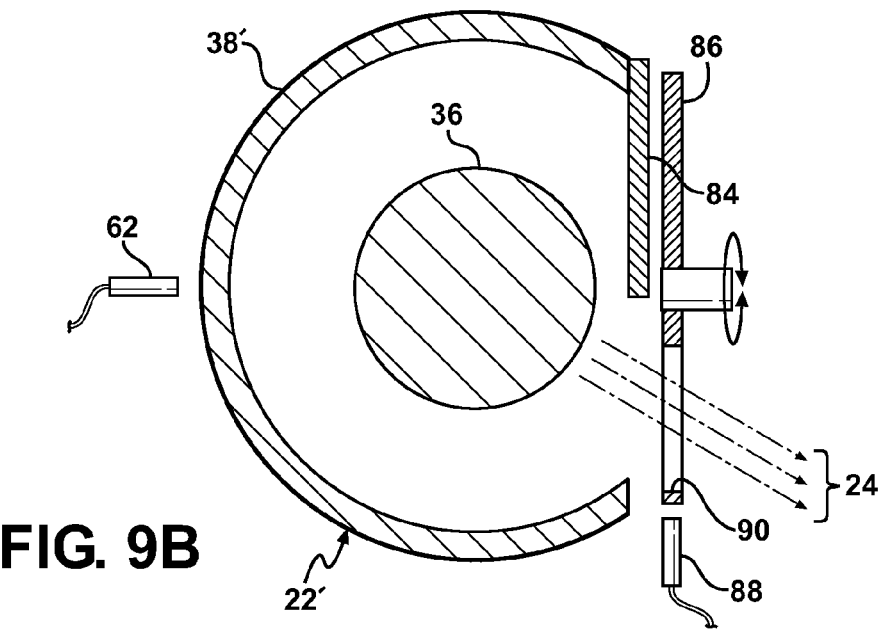

FIGS. 9A and 9B depict a simplified cross-section taken through either of the embodiments of FIG. 7 or 8, wherein a neutron beam 24 is formed, controlled and directed by movement of the reticule 86 relative to the first shield 38'. It should be noted, that it is not necessary that the first shield 38' be rotatable, although providing rotation relative to the carrier 74 will provide added scanning convenience. FIGS. 9A and 9B are schematic depictions of the single rotating reticule 86 embodiment of FIGS. 7 and 8 showing a neutron beam 24 emanating through the aperture 90 in the rotating reticule 86. FIG. 9A represents the relative position of the rotating reticule 86 and non-rotating shutter 84 at time T1 where the aperture 90 in the rotating reticule 86 is eclipsed by the non-rotating shutter 84 so that no neutron beam emanates from the apparatus 20. FIG. 9B represents time T2 showing a neutron beam 24 emanating through the aperture 90 in the rotating reticule 86.

Figure 10:
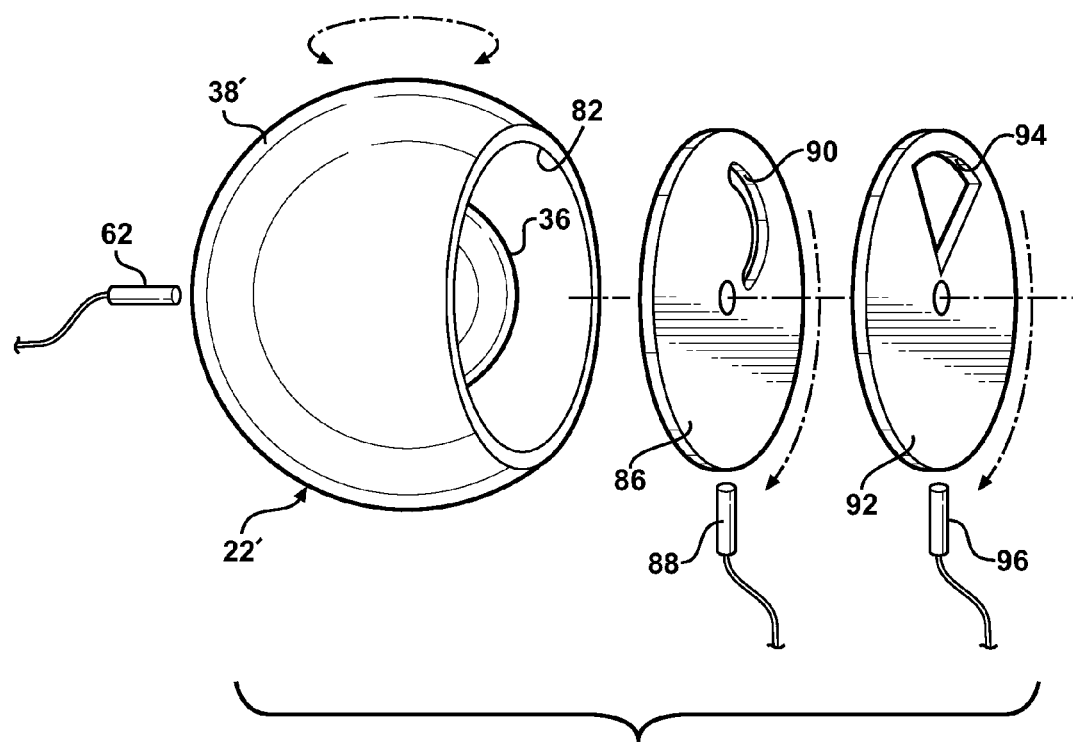
FIG. 10 is an exploded, perspective view showing another embodiment of the shielding system, wherein two, independently rotatable reticules are supported relative to a generally spherical first neutron shield, with each reticule having an aperture therein.

FIG. 10 shows a pair of co-axially located planar rotating reticules 86, 92 without any shutter over the opening 82. In this embodiment, the apertures 90, 94 in the reticules 86, 92 have different shapes, and the directions of rotation are opposite. The rotation speeds are variable, and may bear no simple relationship to one another, except for fulfilling the requirements of the specific task. Likewise, the shapes and sizes of the apertures 90, 94 in the reticules may be designed to deliver a neutron beam 24 with a scan speed, angular size, and within scan limits dictated by the problem addressed by the apparatus. For simplicity, additional shielding to prevent the leakage of neutrons due to the thickness of the reticules 86, 92 is not shown. A position sensor 96 monitors the instantaneous position of the second reticule 92.

Figure 11A:
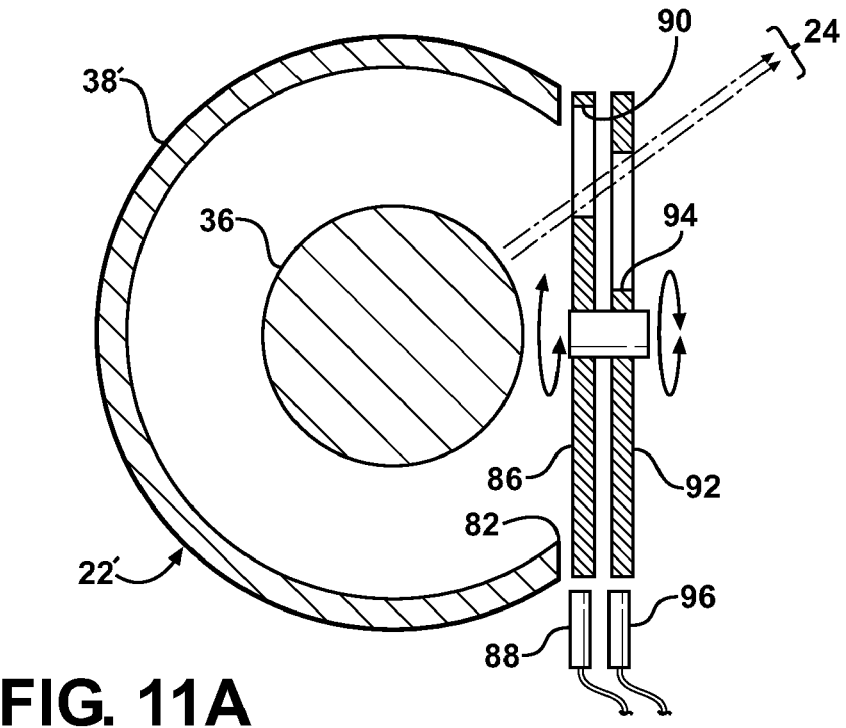
FIGS. 11A and 11B are simplified, cross-sectional views of the shielding embodiment of FIG. 10, wherein the two reticules are shown at different, time-displaced positions so that the neutron beam projecting from the neutron source can be controllably directed along a predictable vector toward the search area.
Figure 11B:
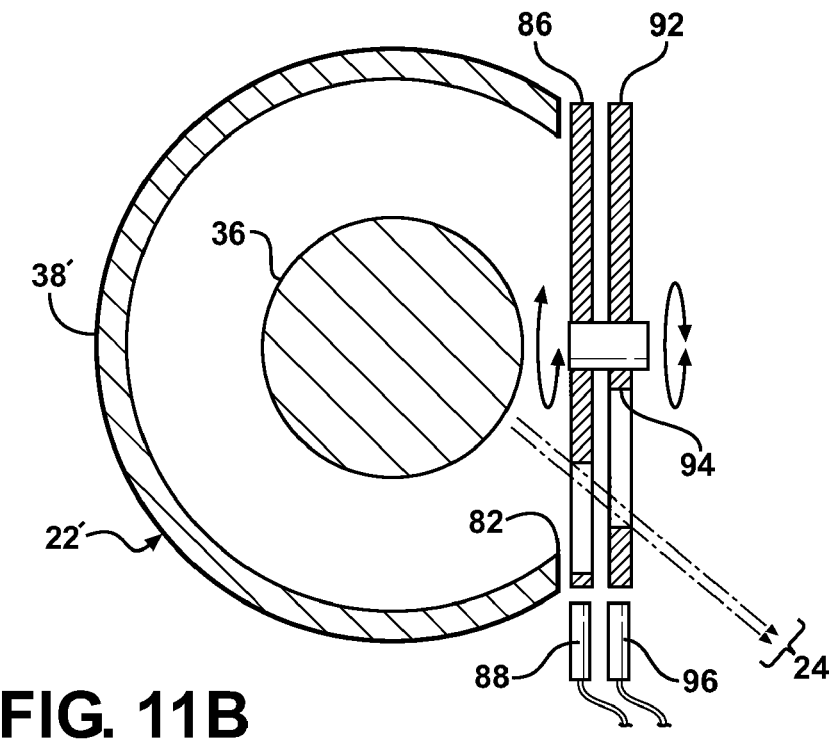

FIGS. 11A and 11B are schematic depictions of the co-axial rotating reticules 86, 92 embodiment of FIG. 10. FIG. 11A represents the relative positions of the reticules 86, 92 at time T1 where the overlapping portions of apertures 90, 94 in the two rotating reticules 86, 92 allow a neutron beam 24 to be directed in a general vector away from the apparatus 20. FIG. 11B represents time T2 showing a neutron beam 24 emanating through the overlapping portions of apertures 90, 94 in the two rotating reticules 86, 92 along a different vector so as to illustrate a sweeping path or motion for the neutron beam 24 between times T1 and T2.

Figure 13:
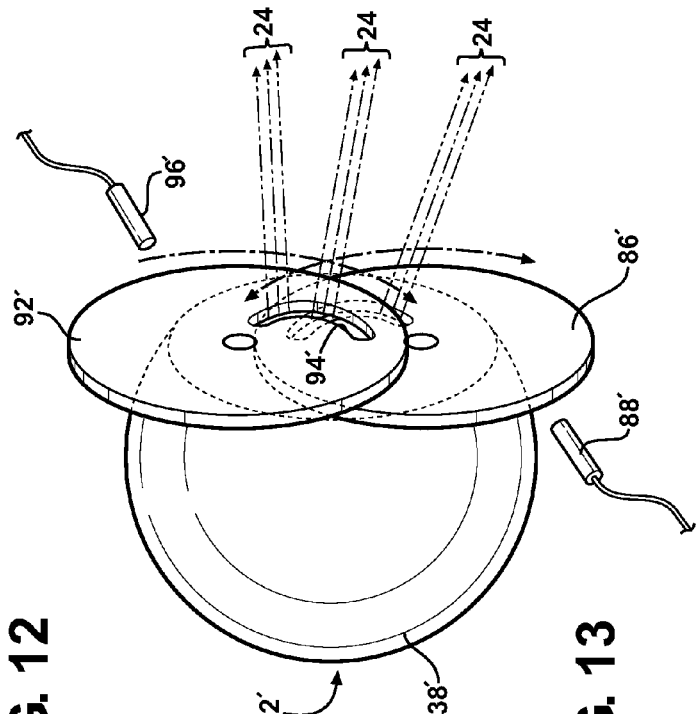
FIG. 13 is an assembled view of the embodiment illustrated in FIG. 12 showing the manner in which the projected neutron beam can be scanned along a predictable path by relative movement of the reticules such that the overlapping portions of their respective apertures enable a directional shift in the neutron beam vector.
Figure 12:
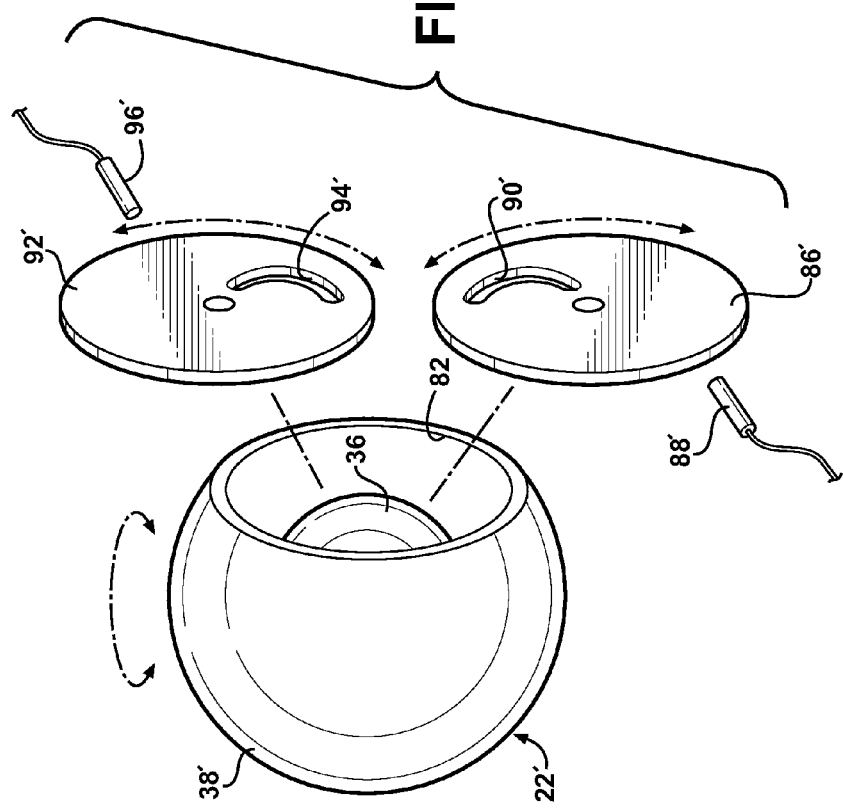
FIG. 12 is an exploded view of yet another shielding configuration wherein two reticules, independently rotatable, are supported on respective axes.

FIGS. 12-14B show a pair of co-planar rotating reticules 86', 92'. In this embodiment, as in the previous example, the apertures 90', 94' in the reticules 86', 92' may have different shapes. FIGS. 12 and 13 show apertures 90', 94' with similar shapes that are minor images of one another. In this configuration, the reticules 86', 92' may rotate in opposite directions, although the directions of rotation are variable. Alternatively, the reticules 86', 92' can be driven in partial, back-and-forth rotations to achieve a desired scan path. As above, the speeds are variable, and may bear no simple relationship to one another, except for fulfilling the requirements of the specific task. The shapes and sizes of the apertures 90', 94' can be designed to deliver a neutron beam 24 with a scan speed, angular size, and within scan limits dictated by the problem addressed by the apparatus.

Figure 14B:
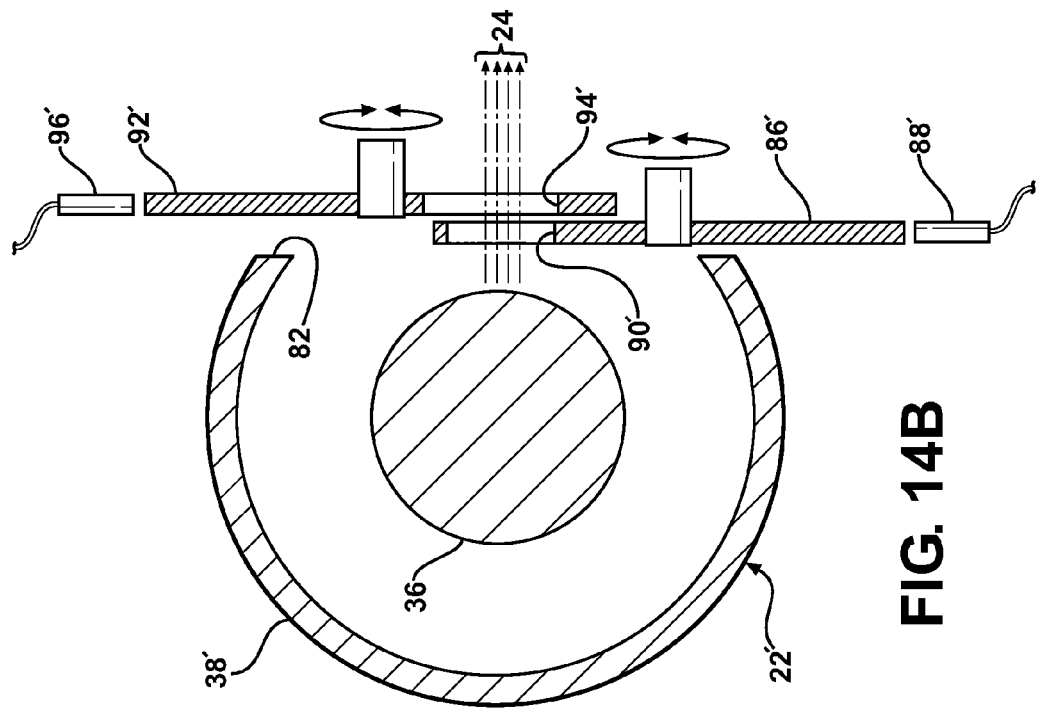
FIGS. 14A and 14B represent time-shifted examples whereby the neutron beam can be controlled in its projection by relative movement between the two reticules.
Figure 14A:
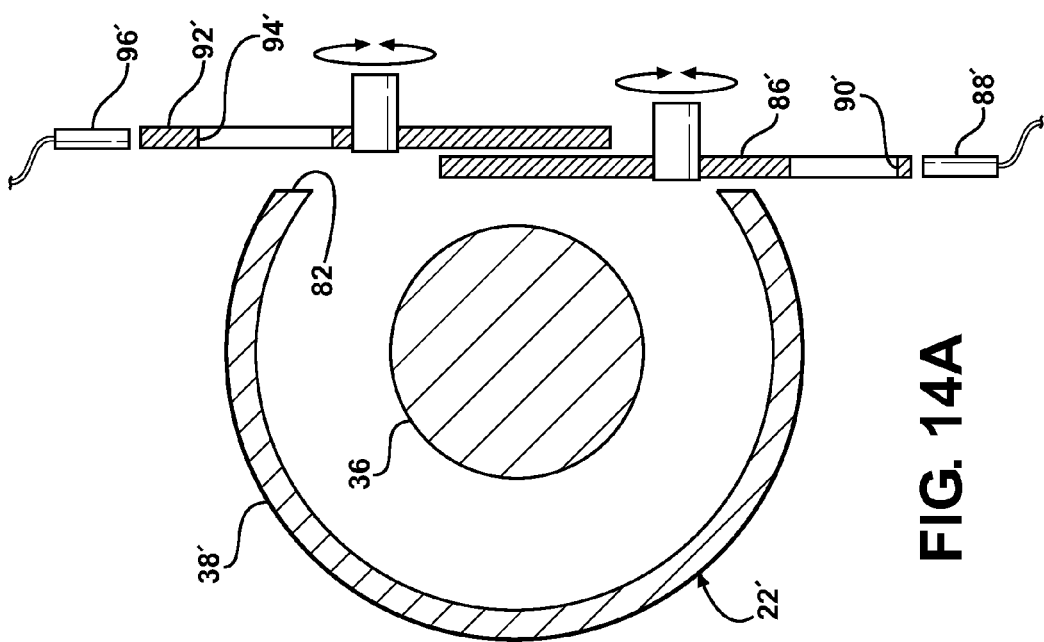

FIGS. 14A and 14B are schematic depictions of the co-planar rotating reticules 86', 92' embodiment of FIGS. 12-13. FIG. 14A represents the relative positions of the reticules 86', 92' at time T1 where there are no overlapping portions of apertures 90', 94' in the two rotating reticules 86', 92' such that no neutron beam emanates from the apparatus at time T1. FIG. 14B represents a later time T2, showing a neutron beam 24 emanating through the overlapping region of the apertures 90', 94'.

Figure 15:
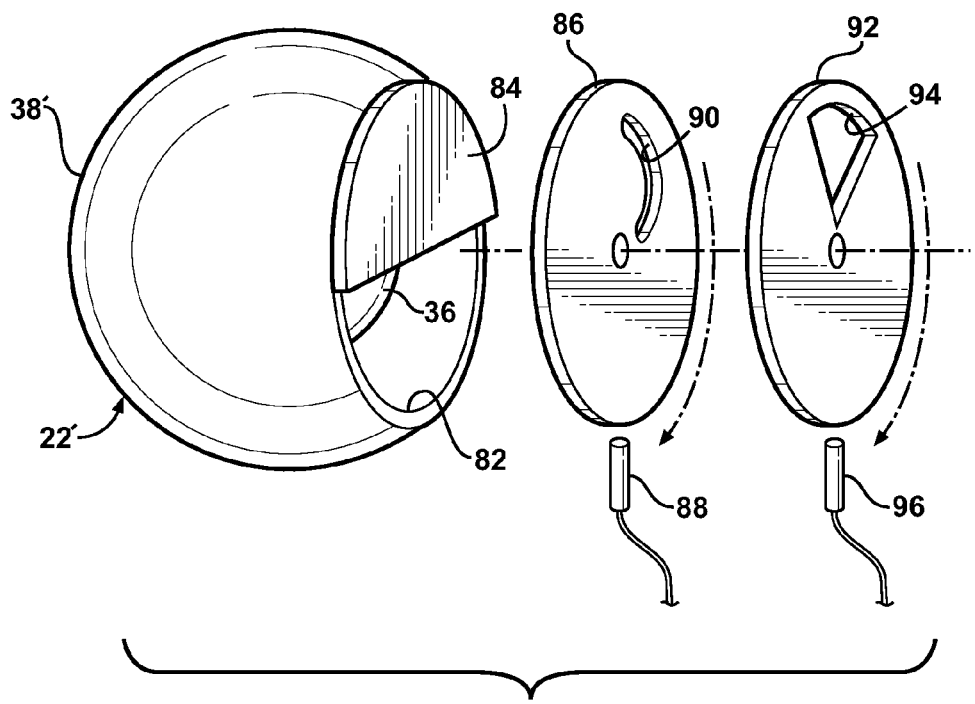
FIG. 15 is an exploded view of yet another alternative embodiment of the shielding configuration wherein two, independently rotatable reticules are supported along a common axis of rotation.
Figure 16:
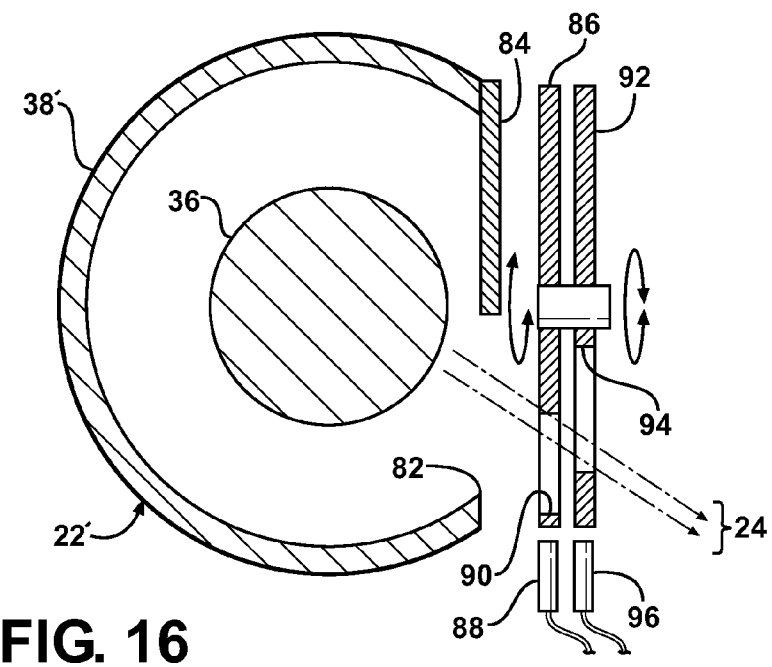
FIG. 16 is a simplified, cross-sectional view of the embodiment illustrated in FIG. 15.

FIG. 15 is an exploded depiction of the co-axial rotating reticules 86, 92 combined with a non-rotating shutter 84 where the overlapping portions of apertures 90, 94 in the two rotating reticules 86, 92 allow a neutron beam 24 to be directed in a general vector away from the apparatus 20, as shown in FIG. 16. FIGS. 17 and 18 show yet another variation wherein the axially offset rotational axes of the reticules 86', 92' are combined with a non-rotating shutter 84.

Although the various views have shown only one aperture slot in each reticule, it will be understood that arrays of such apertures can be arranged in increments about either or both of the reticules, so as to accomplish any of a multiplicity of neutron beam 24 sweep patterns, such as, but not limited to, continuous back-and-forth scanning, with one or more sweeping beams, repeating side-to-side scanning with the scan always moving in the same direction, azimuthal scanning at successively different elevation angles, and other such combinations of scan.

The neutron source 32 emits neutrons in all directions. In the embodiments shown, most of the emitted neutrons are stopped by the shielding that immediately surrounds the source 32. Neutrons not stopped by this shielding are emitted toward the apertures 46, 48, 90, 90', 94 and 94' and comprise the primary beam forming features of the apparatus 20.

Thus, neutrons encountering the surrounding shielding are stopped by it, except for those that pass through the apertures. These neutrons constitute a beam 24. Since the shield and/or reticule is rotating, the beam 24 will rotate with it, thereby enabling a scanning motion.

The apparatus 20 and methods for carrying out the invention utilize at least one and optionally several moving reticule(s) and one or more optional fixed shutters 84 made of suitable neutron shielding material. The reticule(s) cooperate(s) with the permanent shield that surrounds the neutron source 32 and thereby collectively control all (or substantially all) the emission of neutrons from the apparatus 20. Each movable shield or reticule includes an aperture formed therein. The aperture may also include a wedge-shaped cut that goes all the way to the reticule's outer edge, or any other relevant shape designed to suitably control the eminating beam 24. At least one of the reticules moves, or more preferably rotates, relative to the shield or other reticule(s) so that their apertures variably or periodically overlap allowing a neutron beam to be discharged advantageously along a controllable vector. By thoughtfully shaping and orienting the apertures, and controlling the rotational speed(s) of the reticule(s), a discharged neutron beam 24 can be made to scan or translate a predictable path that is useful for sweeping an area of interest, as suggested in FIGS. 3A and 3B.

In cases where a neutron source 32 is used whose neutron flux has the capability of being modulated, for example, electronically, such modulation capability may optionally be employed to further refine the specific path of the produced neutron beam. For example, if mechanical constraints dictate that an otherwise desirable neutron beam scanning path would have some undesirable path segments, then a neutron source capable of modulation could simply either be switched off or else set to a low value during those path segments. Information as to when the neutron source should be modulated would be obtained from the position sensors 62 and 64.

The present invention is directed to an apparatus and methods for effectively detecting and locating explosive substances within remote targets, such as an IED including an artillery round, but not so limited. One major advantage afforded by embodiments of the present invention is that IEDs, including roadside and car bombs, may be detected and located at a standoff distance (e.g. at least 5 meters, 10 meters, or further), thereby reducing casualties and deterring future IED attacks, especially in civilian areas. For instance, a portable detection apparatus in accordance with the present invention may be mounted on a vehicle such that explosive materials could be identified safely and effectively on a routine patrol. (Although a standoff distance of 10 meters would not be sufficient to prevent the death of a dismounted soldier, it would afford significant protection to a soldier inside a modern blast-resistant military vehicle.)

Briefly, the disclosed detection apparatus includes a thermal neutron beam generator, a gamma ray detector, a plurality of data collection modules and sensors, and a detection processing module. The thermal neutron beam generator comprises a fast neutron source, a neutron moderator to slow some or all of the fast neutrons to thermal energies, and a rotatable neutron shield enclosing the generated thermal neutrons. The neutron shield has an aperture to form a thermal neutron beam that may be directed at or scanned over a remote target. If the remote target contains explosive substances or other items of interest, gamma rays radiate isotropically from the remote target when it is bombarded by the neutrons. A portion of these gamma rays are intercepted and detected by the gamma ray detector, which is spaced a few meters apart from the thermal neutron source in order to minimize the nuisance signals created by the neutron-irradiated air path seen by the detector, as well as by the neutron source itself, thereby reducing background noise. This arrangement is known as a "bistatic" orientation. Finally, the detection processing module determines whether the remote target contains explosive substances and further locates the target by processing the collected data from the gamma ray detector, status information collected from the neutron source, and one or more position sensor(s) associated with the neutron shield. More specifically, the position sensor(s) associated with the neutron shield transmit the azimuth and elevation of the aperture to the detection processing module, which in turn determines the thermal neutron beam direction and the remote target's location.

Embodiments of the present invention include a second, preferably rotatable, neutron shield defining a second aperture. The two apertures are each oriented in a different axis, and each neutron shield may rotate independently at different speeds or remain fixed. This arrangement provides further control and fine tuning of the neutron beam's direction, its scanning speed, and its dimensions.

Embodiments of the present invention include other features, including but not limited to neutron amplifiers, neutron focusing elements, neutron beam-forming components, distance or imaging sensors, and a pixilated gamma ray detector. The gamma ray detector may be either monolithic or contain multiple elements. A detector with a large number of sensing elements may be described as "pixilated." The proposed pixilated gamma ray detector is useful to more accurately locate the position of a hostile target by recognizing the incident angle of incoming gamma rays.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. An apparatus for locating concealed, hostile targets at a remote distance by inducing then detecting gamma rays from the target, said apparatus comprising:
   a neutron source for producing a neutron beam capable of generating gamma rays upon interaction with a target;
   a beam former for directing a neutron beam from said neutron source along a vector toward the search area;
   a gamma ray detector for detecting gamma rays emanating from a target in the search area; and
   said gamma ray detector including a plurality of gamma sensing elements for independently detecting gamma ray energy level from a target in the search area to help spatially locate the target from a remote distance by correlating both energy and trajectory of incoming gamma rays,
   further including a carrier for supporting said neutron source opposite a search area; a moveable connection operatively associated with said beam former for moveably scanning the neutron beam vector relative to said carrier across a wide search area; at least one position sensor associated with said beam former for monitoring the instantaneous vector of the neutron beam relative to said carrier; and a detection processing module operatively coupled to said sensor and said gamma ray detector for associating the instantaneous vector of the neutron beam relative to said carrier at the moment said gamma ray detector detects gamma rays from a target in the search area.

2. A method for locating concealed, hostile targets at a remote distance by inducing then detecting gamma rays from the target, comprising the steps of:
   projecting a beam of neutrons along a vector toward a search area;
   producing gamma rays by the interaction of the projected neutron beam with a target in the search area;
   monitoring for gamma rays with a gamma ray detector;
   determining when the gamma rays monitored by the gamma ray detector meet at least one predetermined condition; and
   said step of monitoring for gamma rays including detecting gamma ray energy from a plurality of locations and correlating both energy and trajectory of incoming gamma rays to help spatially locate the target from a remote distance,
   further including scanning the neutron beam methodically across the search area; specifying the orientation of the neutron beam vector simultaneously with said signaling step; and locating the target in the search area by reference to the neutron beam vector oriented during said specifying step.

* * * * *